United States Patent
Araki et al.

(10) Patent No.: US 6,370,092 B1
(45) Date of Patent: Apr. 9, 2002

(54) OPTICAL PICKUP AND OPTICAL DISK DRIVE FOR USE WITH A HIGH-DENSITY OPTICAL DISK

(75) Inventors: Yoshitsugu Araki; Takanori Maeda; Hajime Koyanagi, all of Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/239,714

(22) Filed: Jan. 29, 1999

(30) Foreign Application Priority Data

Jan. 29, 1998 (JP) .......................................... 10-031992

(51) Int. Cl.[7] ................................................. G11B 7/09
(52) U.S. Cl. .............................. 369/44.23; 369/44.28; 369/44.37; 369/112.01
(58) Field of Search ........................... 369/53.11, 53.1, 369/53.28, 44.23, 44.12, 44.14, 44.27, 44.28, 44.32, 44.37, 44.41, 44.42, 109.01, 109.02, 112.01, 112.03, 112.07

(56) References Cited

U.S. PATENT DOCUMENTS 4,525,826 A * 7/1985 Nakamura et al. ........ 369/44.42
5,625,613 A    4/1997 Kato et al. ................... 369/112
5,835,467 A    11/1998 Tomita et al. ................. 369/59
6,222,804 B1 * 4/2001 Yoshizawa ............... 369/44.41

FOREIGN PATENT DOCUMENTS

| JP | H07-234382 | 9/1995 |
| JP | H09-147408 | 6/1997 |
| JP | H09-320200 | 12/1997 |

* cited by examiner

Primary Examiner—Muhammad Edun
(74) Attorney, Agent, or Firm—Morgan, Lewis & Bockius LLP (57) ABSTRACT

An optical pickup for reading information from a recording medium comprises a light illuminating portion for illuminating a plurality of light beams having different wavefronts onto a recording surface of the recording medium to create a plurality of light spots including a first light spot and a second light spot. The first and second light spots at least partially overlap with each other. A detector receives light beams reflected by the recording medium. The detector has a first light-receiving surface for receiving reflected light of the first light spot and a second light-receiving surface for receiving reflected light of the second light spot.

25 Claims, 13 Drawing Sheets

OPTICAL PICKUP AND OPTICAL DISK DRIVE FOR USE WITH A HIGH-DENSITY OPTICAL DISK

BACKGROUND OF THE INVENTION

This application claims the benefit of Japanese Patent Application No. 10-31992, filed on Jan. 29, 1998, which is hereby incorporated by reference.

1. Field of the Invention

The present invention relates generally to an optical pickup and an optical disk drive for reproducing video signals, audio signals, and other data from an optical recording medium and more particularly, to an optical pickup in an optical disk drive for reproducing information on a high-density optical disk having a narrowed track pitch.

2. Description of the Related Art

In recent years, there has been demand for increasing optical disk recording density to facilitate recording vast amounts of information onto a single optical disk. For example, it would be desirable for a full motion picture for high definition television to be stored onto one disk. Attempts have been made to narrow the track on the disk (i.e., decreasing the track pitch), to increase the recording density. However, if an optical disk with a narrowed track pitch is reproduced without reducing the spot size formed on the optical disk, a crosstalk component from adjacent tracks increases, which deteriorates the signal-to-noise ratio of the reproduced signal.

A conventional method for removing the crosstalk is to use three beams. These beams are positioned to hit three adjacent tracks, resulting in three spots. Signals produced from the side spots are subtracted from a signal obtained from the center spot.

Figure 13:
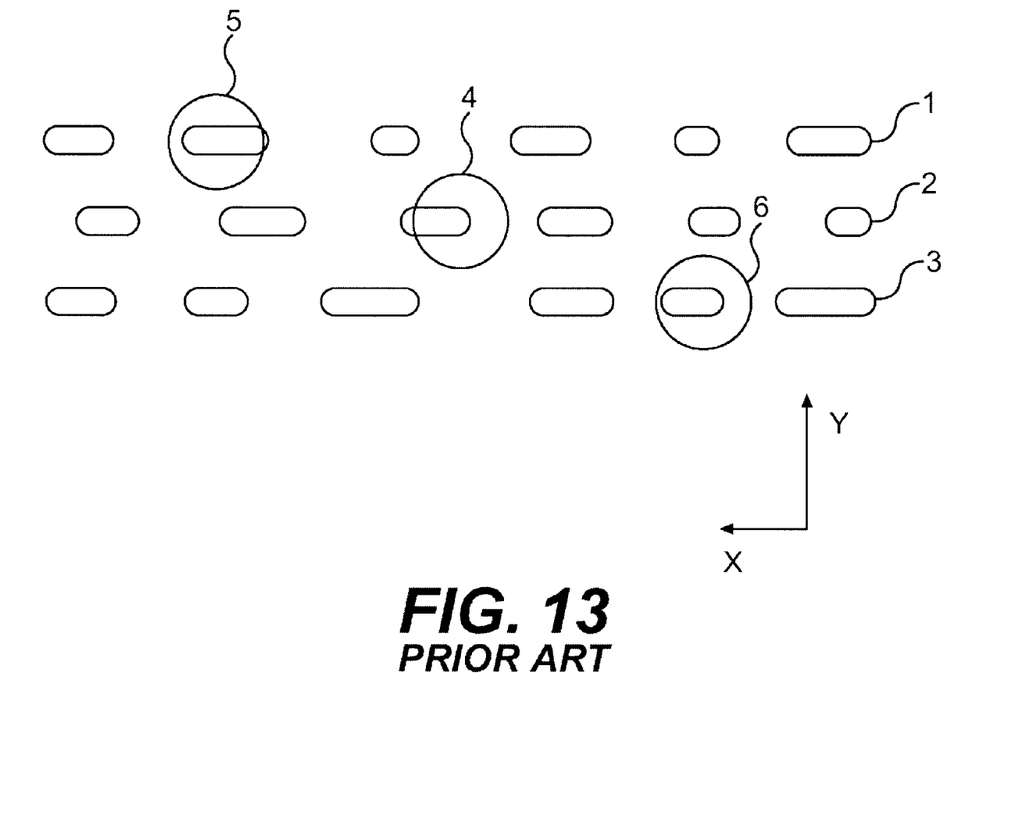
FIG. 13 is a view illustrating light spots formed on an optical disk by the conventional device.

As an example, FIG. 13 illustrates a method using three beams, in which center light spot 4 is made to strike a track 2 to read information from track 2. In this scheme, other light spots 5 and 6 are positioned to hit tracks 1 and 3, adjacent to track 2. The center spot 4 primarily includes a signal from track 2, but also contains signals leaking from adjacent tracks 1 and 3. The side spots 5 and 6 mainly contain signals from tracks 1 and 3, respectively. In this method, the amount of light of the crosstalk component from the adjacent tracks to the light spot 4 is different from the amount of light of the signal components from tracks 1 and 3 contained in the side spots 5 and 6. Therefore, the amount of light of the signal components contained in the side spots 5 and 6 is reduced to coincide with the crosstalk component from the adjacent tracks to the center spot 4, and the obtained crosstalk components are subtracted from the signal component contained in the center spot 4.

In FIG. 13, the X-axis direction lies in the direction of tracks and corresponds to the direction of time axis during playback. The Y-axis direction is vertical to the track direction and corresponds to the radial direction of the disk. The light spots 4, 5, and 6 are positioned to hit positions offset from each other, both in the X- and Y-axis directions. Therefore, beams reflected from these spots can travel to mutually spaced detectors on a detector array (not shown). The reflected beams can be separately detected by the detectors spaced from each other. Consequently, the crosstalk component can be removed by subtracting the reflected beams of the side spots 5, 6 from the reflected beam originating from the center spot 4.

The light spots 4, 5, and 6 in FIG. 13 are spaced from each other in the direction of the time axis as well as in the radial direction. Therefore, prior to the subtractive processing for removing the crosstalk, the time offsets of the beams reflected from the light spots 4, 5, and 6 must be corrected for the linear velocity of rotation. However, where certain data is sought on the optical disk, such as for a high speed scan, or where data is read at a constant rotational speed, the linear velocity is not kept constant. Therefore, when the crosstalk component is to be removed, it is necessary to correct varying time offsets of the light spots, increasing the difficulty and complexity in removing the crosstalk component.

Another method for removing offsets of the light spots on the time axis is to arrange the light spots 4, 5, and 6 to be at the same position in the X-axis direction, but this is not effective. The light spots on the recording surface of an optical disk are focused to the diffraction limit. However, the beams reflected from the disk are not focused to the diffraction limit on the light-receiving surface of the detector because various servo signals must be obtained. Consequently, the spacing between the reflected beams on the light-receiving surface of the detector is narrower than the spacing between the light spots on the recording surface. If the track pitch on the recording surface is narrower, the light spots on the recording surface are closer and overlap with each other. In such a case, the beams reflected from the disk further overlap with each other on the light-receiving surface of the detector. In order to remove the crosstalk component, the beams reflected from the light spots must be detected separately. Since the detector cannot separate the overlapping reflected beams, it is impossible to remove the crosstalk component.

SUMMARY OF THE INVENTION

Accordingly, the present invention is directed to an improved optical pickup and optical disk drive that substantially obviates one or more of the problems due to the limitations and disadvantages of the related art.

An object of the present invention to provide an optical disk drive for use with a recording medium recorded with a narrow track pitch that removes crosstalk leaking from adjacent tracks, thus permitting signals to be read from the medium with a good signal-to-noise ratio.

According to one aspect of the present invention, there is provided an optical pickup having a light illuminating portion for illuminating a plurality of light beams having different wavefronts onto a recording surface of the recording medium to create a plurality of light spots, including a first light spot and a second light spot, the first and second light spots at least partially overlapping with each other, and a detector for receiving light beams reflected by the recording medium, the detector having a first light-receiving surface for receiving reflected light of the first light spot and a second light-receiving surface for receiving reflected light of the second light spot.

According to another aspect of the present invention, there is provided a optical disk drive having a optical pickup including a light illuminating portion for illuminating a plurality of light beams having different wavefronts onto a recording surface of the recording medium to create a plurality of light spots including a first light spot and a second light spot, the first and second light spots at least partially overlapping with each other, and a detector for receiving light beams reflected by the recording medium, the detector having a first light-receiving surface for receiving reflected light of the first light spot and a second light-receiving surface for receiving reflected light of the second light spot, and operation means for obtaining a signal representing information recorded on the recording medium based on a first output signal from the first light-receiving surface and a second output signal from the second light receiving surface.

Other objects and features of the invention will appear in the course of the description thereof, which follows.

DETAILED DESCRIPTION OF THE INVENTION

Figure 1:
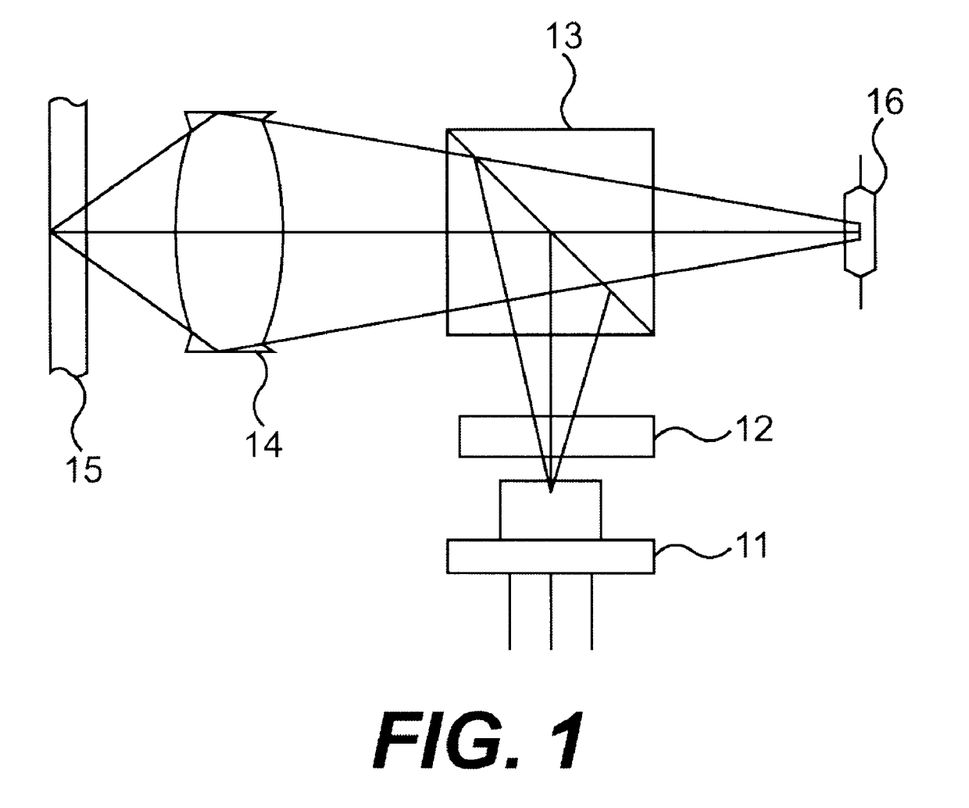
FIG. 1 is a diagram illustrating the structure of an optical pickup in accordance with the invention.

Referring to FIG. 1, there is shown an optical pickup for use in an optical disk drive in accordance with the present invention. The optical pickup includes a semiconductor laser 11 as a light source, a holographic diffraction element 12 for diffracting the light beam emitted by the laser 11 into zeroth-order light and first-order light, a beam splitter 13 having a semitransparent film for both reflecting the light beam from the semiconductor laser 11 and passing the beam reflected from the optical disk 15 to guide the beams in different directions, an objective lens 14 for focusing the light beams onto the optical disk 15, and a detector 16 for receiving the beams reflected from the optical disk 15.

The light beam emitted from the semiconductor laser 11 is diffracted by the holographic diffraction element 12, reflected by the semitransparent film of the beam splitter 13, and focused onto the recording surface of the optical disk 15 by the objective lens 14, creating light spots on the surface. The light beams impinging on the optical disk 15 are reflected by the recording surface and hit the detector 16 via the beam splitter 13. With this structure, the light beams are illuminated onto the optical disk 15, information is read from the recording surface of the optical disk 15, and the original information is recreated by a processing circuit (not shown).

Figure 2A:
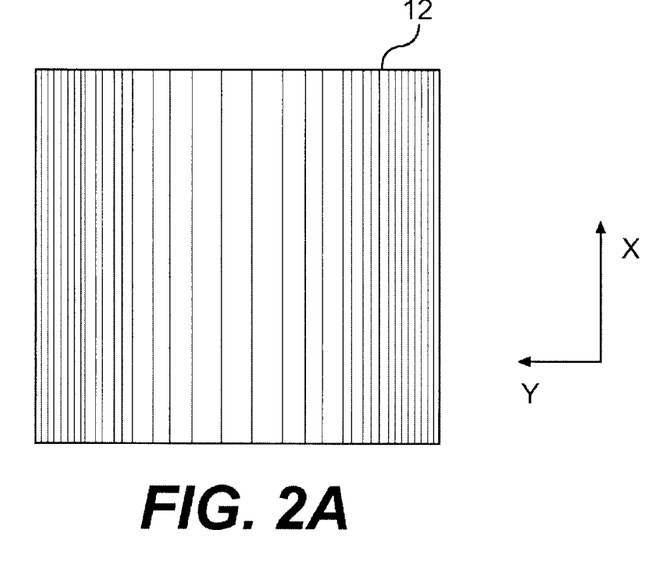
FIGS. 2A and 2B are diagrams illustrating a holographic diffraction element used in the optical pickup shown in FIG. 1.
Figure 2B:
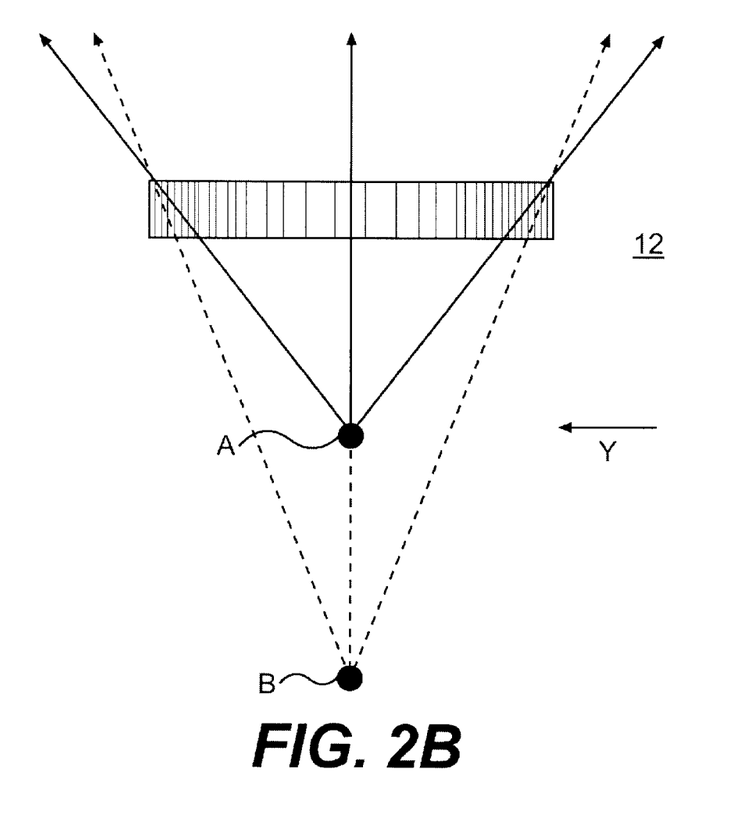

One example of a pattern on the holographic diffraction element 12 used in the optical pickup shown in FIG. 1 is depicted in FIGS. 2A and 2B. FIG. 2A is a plan view of the diffraction element. FIG. 2B is a side elevation of the element. The holographic diffraction element 12 is positioned such that the X-axis direction of the light beam passing through the diffraction element 12 is tangential to the optical disk 15 on the recording surface of the disk, in the longitudinal direction of the track. The Y-axis direction is in the normal direction, i.e., vertical to the longitudinal direction of the track.

As shown in FIG. 2A, the pattern of the holographic diffraction element 12 is composed of fringes that become denser gradually toward the ends from the center in the Y-axis direction. The holographic diffraction element 12 provided with this pattern diffracts the wavefront of the first-order light in the X-axis direction such that the light approaches parallel light, as shown in FIG. 2B. The diffraction element 12 passes the wavefronts of the zeroth-order light and the first-order light in the Y-axis direction intact. The action of the holographic diffraction element 12 places the light source of the first-order light in the X-axis direction at point A. A virtual image of the light source of the first-order light in the Y-axis direction is located at point B. The positions of the virtual images of the light source in the X- and Y-axis directions are made different in this way. Consequently, the first-order light is a light beam having astigmatism.

Figure 3A:
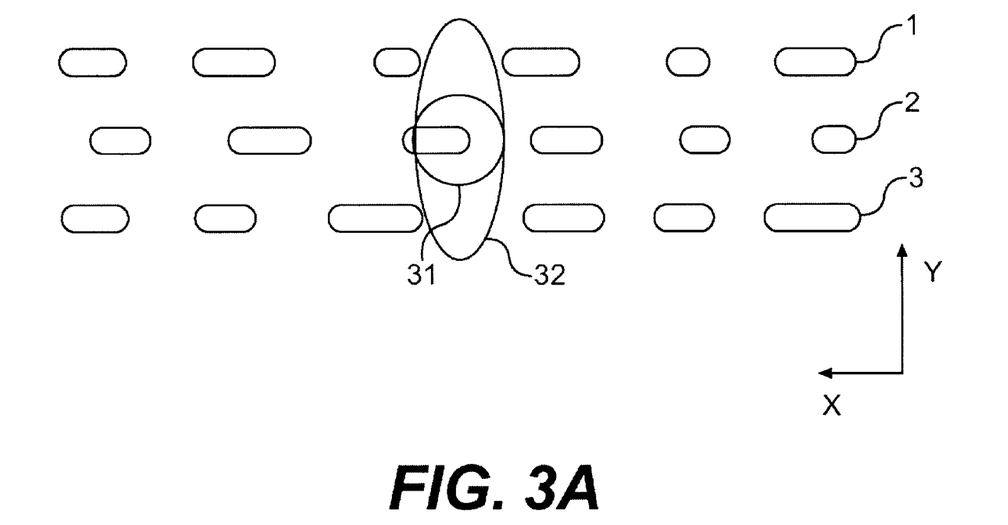
FIGS. 3A and 3B are diagrams illustrating light beams impinging on the optical disk.
Figure 3B:
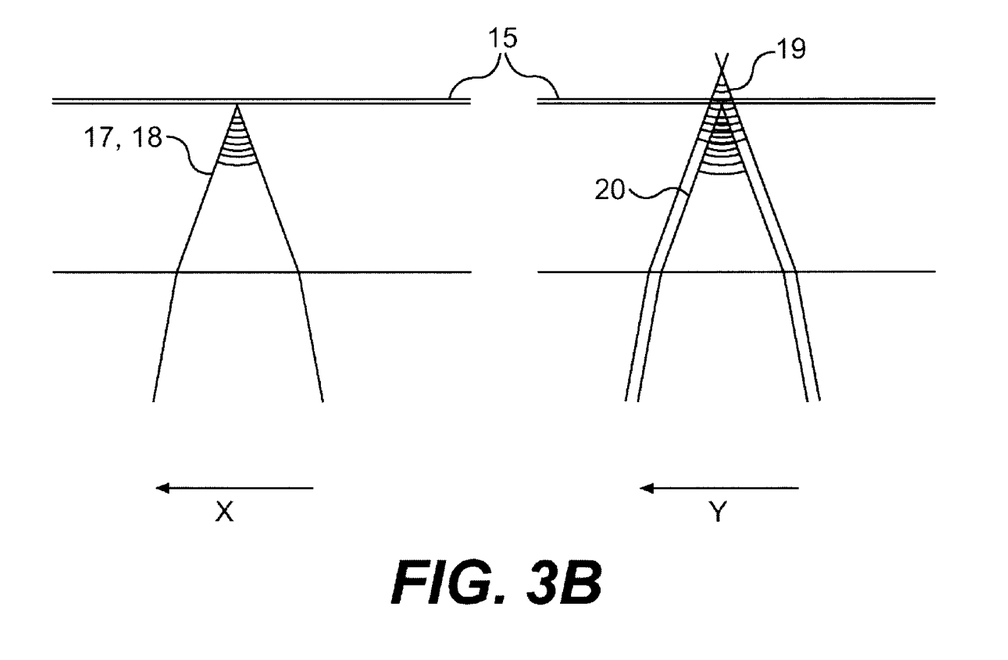

With the holographic diffraction element 12, the light beams create light spots 31 and 32 on the optical disk 15 as shown in FIG. 3A, which shows the shapes of the spots formed on the recording surface of the optical disk 15. FIG. 3B illustrates the light beams impinging on the optical disk 15.

As shown in FIG. 3A, data tracks 1, 2, and 3 are formed substantially parallel to the X-axis direction on the recording surface of the optical disk 15. Each track consists of an array of pits. The zeroth-order light, which is undiffracted light from the holographic diffraction element 12, creates the light spot 31 on the recording surface. The holographic diffraction element 12 imparts astigmatism to the first-order light, which forms the light spot 32 on the recording surface. Since the light spot 31 is free of aberrations, this spot is focused close to the diffraction limit on the recording surface.

As shown in FIG. 3B, the focal point of the zeroth-order light 17 and the focal point of the first-order light 18 in the X-axis direction are on the recording surface 15. On the other hand, the focal point of the first-order light 19 in the Y-axis direction is off the recording surface. Therefore, the astigmatism increases the width of the light spot 32 in the Y-axis direction on the recording surface that is at the diffraction limit of the light spot 31. The spot 32 is elliptical and extends over three tracks. Hence, the beam reflected from the light spot 32 is higher than the beam reflected from the light spot 31 in ratio of the crosstalk component from the adjacent tracks to the total amount of light.

The zeroth-order light is light free of aberrations and is uniform in cross section in the X- and Y-axis directions. The zeroth-order light is focused on the recording surface. Therefore, the wavefront of the zeroth-order light, i.e., the equiphase wave surface, is a sphere centered at the recording surface. The scope of this sphere is limited by the aperture of the objective lens. For this reason, the wavefront of the light spot 31 at the focal point of the zeroth-order light is circular. The first-order light has astigmatism and so its wavefront is a sphere centered at the recording surface in the X-axis direction, the scope of the wavefront being limited by the aperture of the objective lens in the same way as the zeroth-order light. In the Y-axis direction, however, the wavefront is a sphere centered at a position deeper than the recording surface. Consequently, the wavefront of the light spot 32 of the first-order light is elliptical. That is, the shape of the wavefront of the first-order light is such that its toric surface is limited by the aperture of the objective lens. Accordingly, the intensity of the first-order light as viewed from the longitudinal direction of the light spot is distributed more widely and mildly than the intensity of the zeroth-order light. Consequently, the light spot 32 is higher than the zeroth-order light in ratio of crosstalk component from adjacent tracks to the total amount of light.

The beams reflected from the light spots 31 and 32 are focused by the objective lens 14, guided to the photodetector 16, and converted into electric signals. Since this detector 16 is positioned at the focal point in the Y-axis direction in which the major axis of the elliptical light spot 32 lies, the beam reflected from the light spot 31 is out of focus and spread widely.

Figure 4:
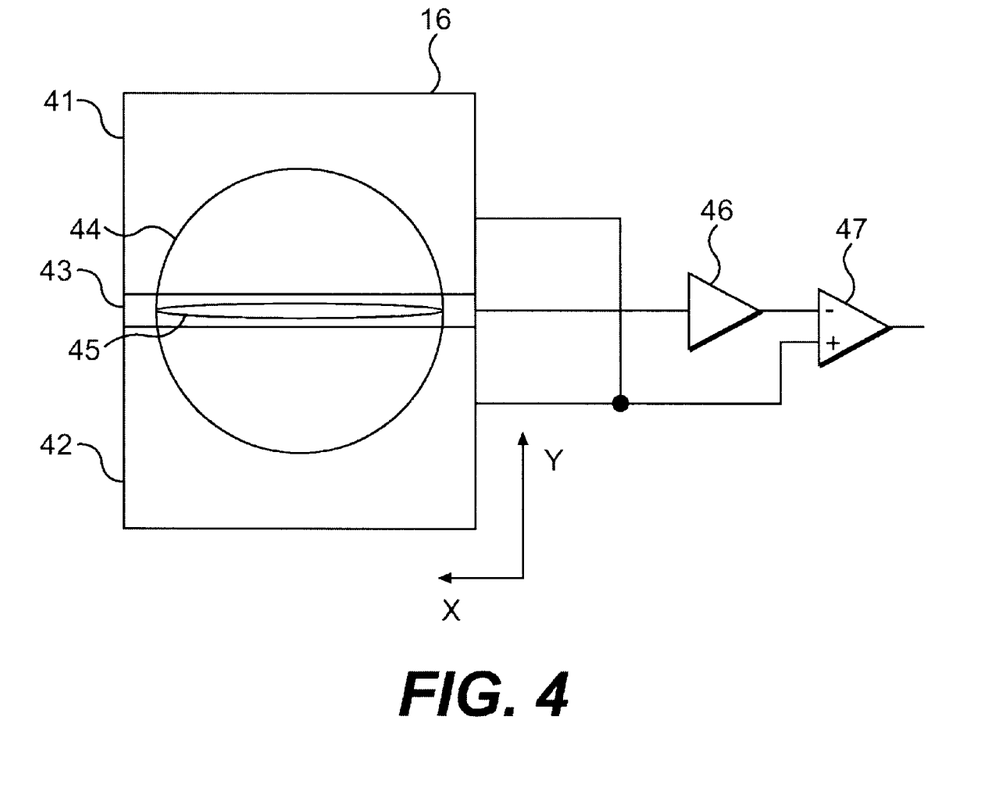
FIG. 4 is a diagram illustrating a pattern of the light-receiving surface of the detector and the distribution of the reflected beam impinging on the detector.

The pattern on the light-receiving surface of the detector 16 and the distribution shape of the reflected beam hitting the detector 16 are shown in FIG. 4. The detector 16 has three light-receiving surfaces 41, 42, and 43 arrayed in the Y-axis direction. Only the beam 44 reflected from the light spot 31 is made to hit the light-receiving surfaces 41 and 42. Beam 45 reflected from the light spot 32 and a central portion of the beam 44 reflected from the light spot 31 hit the light-receiving surface 43. The sum of the outputs from the light-receiving surfaces 41 and 42 is applied to the positive (+) terminal of a subtractor 47. The output from the light-receiving surface 43 is multiplied by a given integer by an amplifier 46 and applied to the negative (−) terminal of the subtractor 47 and subtracted from the sum of the outputs from the light-receiving surfaces 41 and 42.

Since the amount of light of the adjacent track component contained in the light-receiving surfaces 41 and 42 is different from the amount of light of the adjacent track component contained in the light-receiving surface 43, an amplification factor k of the amplifier 46 is selected such that the amounts of light of the crosstalk components represented by the signals applied to the positive and negative terminals of the subtractor 47 are coincident with each other. By setting the amplification factor k to its optimum value, the signal component from the center track 2 is obtained as the output of the subtractor 47 from which the adjacent crosstalk component has been removed. Although the reflected beam 44 partially hits the light-receiving surface 43, the crosstalk component from the adjacent tracks can be reduced accurately by sufficiently focusing the reflected beam 45 and narrowing the light-receiving surface 43.

The amplification factor k may be a constant value determined according to the track pitch. Alternatively, the amplification factor k may be automatically controlled at all times so as to minimize the amount of the crosstalk component. For this method, the amount of light of the crosstalk component that remains in the output from the subtractor 47 is first detected and the output from the subtractor is then fed back to the amplifier to minimize the amount of light of the crosstalk component. For example, the correlation between adjacent tracks can be detected using a method described in Japanese Unexamined Patent Publication No. H09-320200. The amount of the crosstalk component is then found, and the amplification factor k is automatically controlled at all times so as to minimize the amount of the crosstalk component.

The pattern on the holographic diffraction element 12 is formed into fringes that become gradually denser toward the ends from the center in the Y-axis direction, as shown in FIG. 2A. Since it suffices to impart astigmatism to the first-order light, the fringes may become denser toward the center from the ends in the Y-axis direction.

Figure 5:
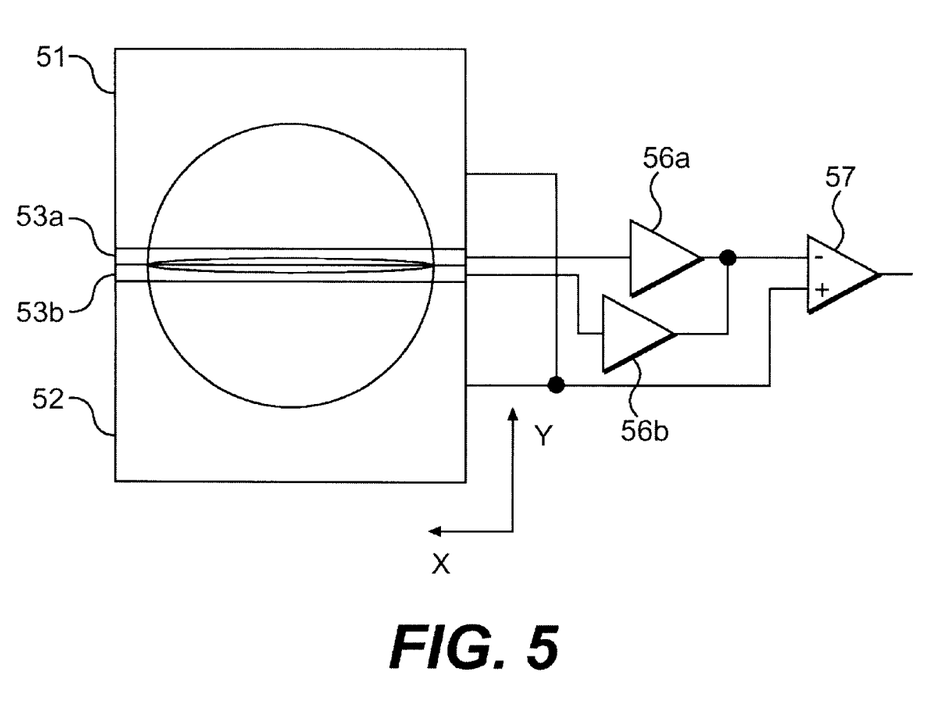
FIG. 5 is a diagram illustrating another pattern of the light-receiving surface of the detector and the distribution of the reflected beam impinging on the detector.

Alternatively, the light-receiving surface 43 of the detector 16 shown in FIG. 4 may be split into two light-receiving surfaces 53a and 53b in the Y-axis direction as shown in FIG. 5. The outputs from the light-receiving surfaces 53a and 53b are applied to amplifiers 56a and 56b, respectively. The sum of the outputs from the amplifiers 56a and 56b are applied to the negative (−) terminal of a subtractor 57. The sum of the outputs from the light-receiving surfaces 51 and 52 is applied to the positive (+) terminal of the subtractor 57. This subtractor 57 produces the difference between these two inputs. In this way, the crosstalk component can be removed.

Where the optical disk 15 is tilted, the amount of light falling on the light-receiving surface 53a will be different from the amount of light falling on the light-receiving surface 53b. If the optical disk 15 is tilted in a radial direction, the crosstalk component can be removed accurately by adjusting the ratio of the amplification factor of the amplifier 56a to the amplification factor of the amplifier 56b in accordance with the ratio of the amount of light falling on the light-receiving surface 53a to the amount of light falling on the light-receiving surface 53b. Thus, both side crosstalk components in the Y-axis direction are removed independently.

Various known methods can be used for focusing and tracking servo signals in this embodiment. If the direction of astigmatism used for focusing is at an angle of 45 degrees to the tracking direction, a focus error signal can be obtained without being affected by a push-pull tracking error signal. With respect to the first-order light, astigmatism induced by the diffraction element and the astigmatism due to the astigmatism-generating elements for focusing are combined constructively to shift the positions of the focal lines. However, the signals can be separated and detected at the position of one focal line in the same way as in the embodiment described above.

Figure 6:
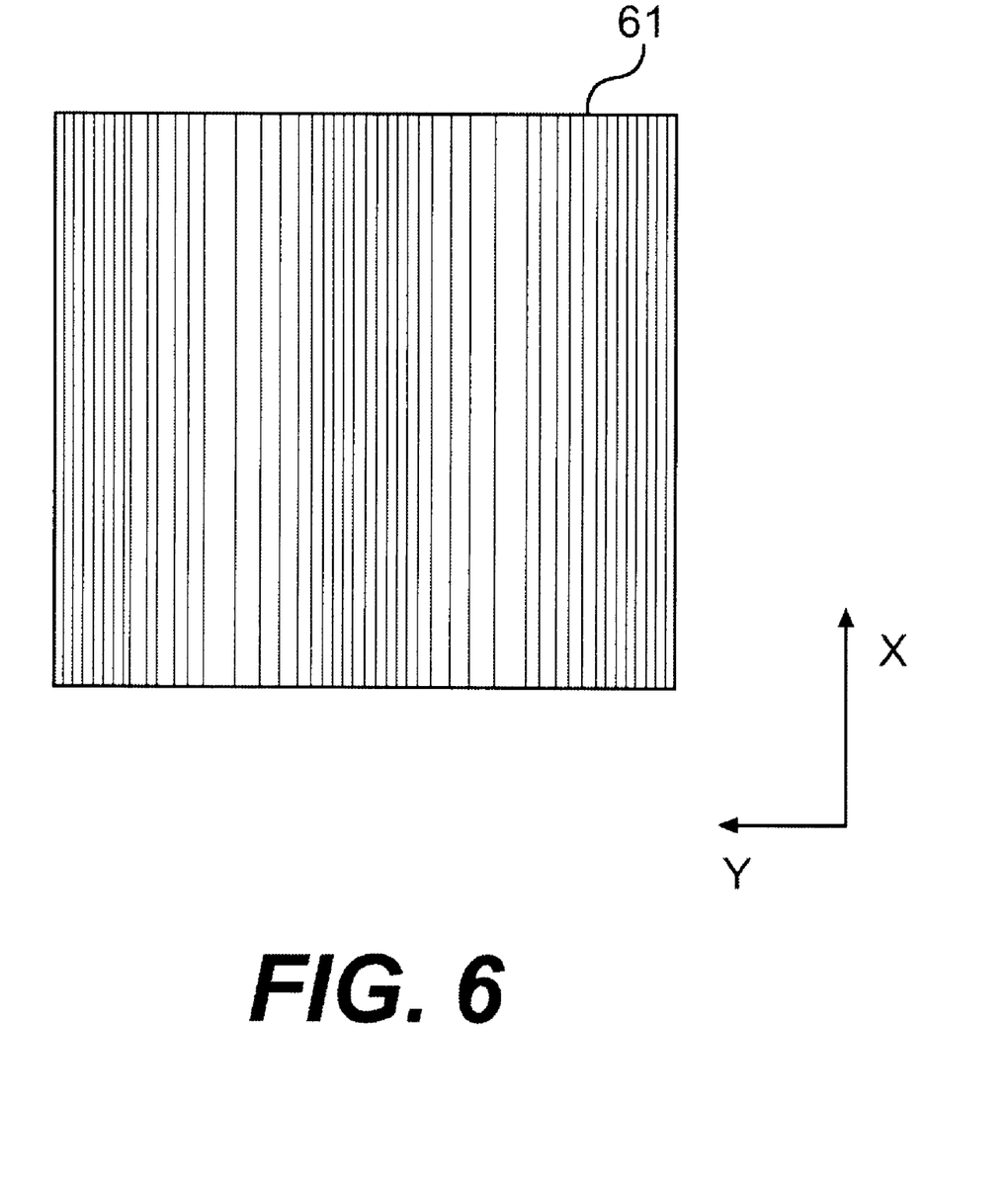
FIG. 6 is a diagram illustrating a holographic diffraction element used in an optical pickup in accordance with another embodiment of the invention.

Instead of the holographic diffraction element 12 described previously, a holographic diffraction element 61 formed by arranging two astigmatism-generating patterns symmetrically about the center in the Y-axis direction also can be used. The pattern on this diffraction element 61 is shown in FIG. 6.

Figure 7:
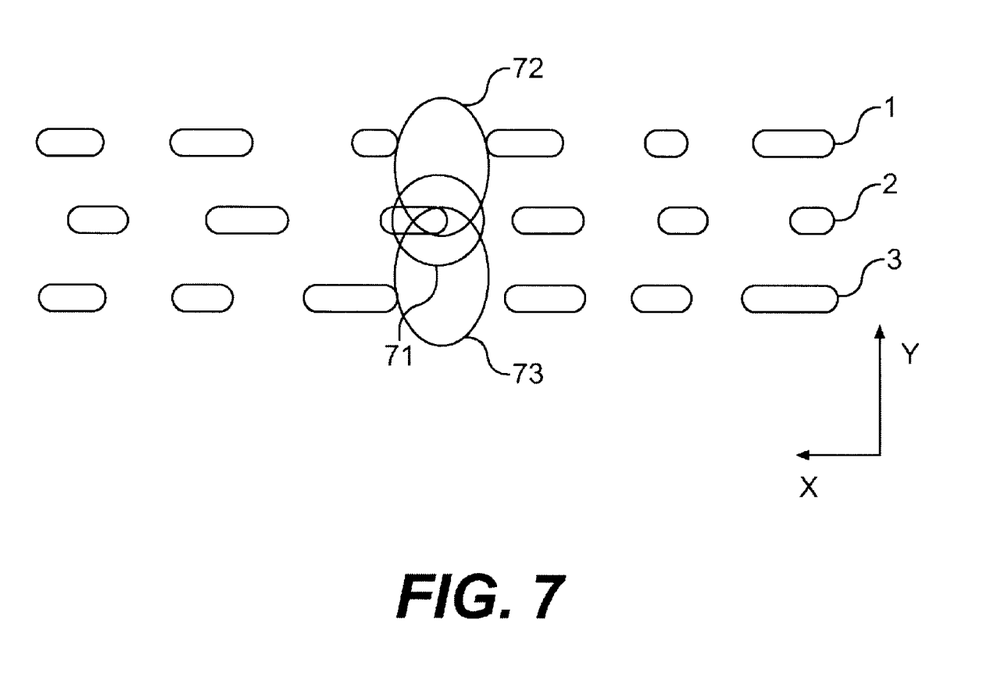
FIG. 7 is a diagram illustrating light beams impinging on the optical disk.

When the holographic diffraction element 61 is used, two virtual images of the light source of the first-order light which are symmetrical about the actual light source in the Y-axis direction are formed. Therefore, as shown in FIG. 7, two light spots 72 and 73 having astigmatism are formed by the first-order light on the opposite sides of the light spot 71 of the zeroth-order light on the recording surface of the optical disk 15.

Figure 8:
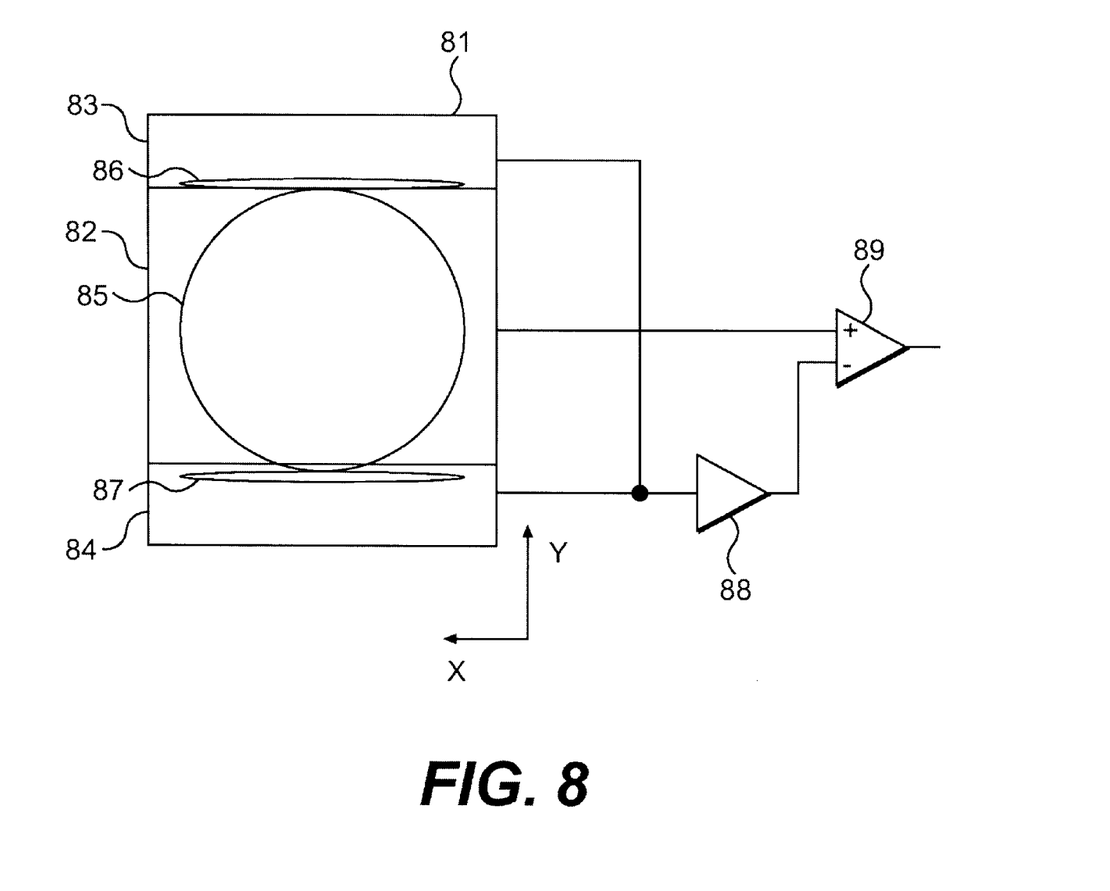
FIG. 8 is a diagram illustrating a pattern of the light-receiving surface of the detector and the distribution of the reflected beam impinging on the detector.

The beams reflected from these light spots 71, 72, and 73 can be detected by a detector 81 as shown in FIG. 8. This detector 81 has three light-receiving surfaces 82, 83, and 84 arrayed in the Y-axis direction. A beam 85 reflected from the light spot 71 hits the light-receiving surface 82. Beams 86 and 87 reflected from the light spots 72 and 73 fall on the light-receiving surfaces 83 and 84, respectively. This detector 81 is also located at the position of the focal line in the Y-axis direction in which the major axis of the elliptical light spots 72 and 73 lies in the same way as in the detector 16 described above, and so the beam reflected from the light spot 71 is out of focus and spread widely. The output from the light-receiving surface 82 is applied to the positive (+) terminal of a subtractor 89. The outputs from the light-receiving surfaces 83 and 84 are multiplied by a constant factor by an amplifier 88 and are applied to the negative (−) input terminal of the subtractor 89 and are then subtracted from the output from the light-receiving surface 82.

In this embodiment, the amount of light of the adjacent track crosstalk component contained in the beam 85 is different from the amount of light of the adjacent track crosstalk component contained in the beams 86 and 87. Therefore, the amplification factor k of the amplifier 88 is selected such that the amounts of light of the crosstalk components represented by the signals applied to the positive and negative terminals of the subtractor 89 are equal. By setting the amplification factor k to its optimum value, the signal component from the center track 2 is obtained as the output of the subtractor 89 from which the adjacent crosstalk component has been removed. This amplification factor k can be a constant value estimated from the stipulated track pitch. Alternatively, the crosstalk that remains in the output from the subtractor 89 may be detected, and automatic adjustment may always be made to minimize the crosstalk component.

If the optical disk 15 is tilted perpendicular to the track direction, the crosstalk component can be removed accurately by removing the two sides of crosstalk components in the Y-axis direction independently by the use of the two light-receiving surfaces 83 and 84.

Since the outputs from the light-receiving surfaces 83 and 84 contain the two sides of crosstalk components in the Y-axis direction, the light-receiving surface 82 may be divided into two parts about the centerline in the Y-axis direction. The outputs from the light-receiving surfaces 83 and 84 may be subtracted from the outputs from the two parts of the light-receiving surface 82. In this way, the two side crosstalk components may independently be removed.

Although the diffraction efficiency of the holographic diffraction element may be made uniform over the whole surface, it is preferable that the diffraction efficiency in the central portion in the Y-axis direction is lowered or the central portion does not diffract. This increases the amount of zeroth-order light, and the amount of the first-order light falling on the center track is decreased. Therefore, only the signal components from the adjacent tracks can be accepted into the first-order light. Consequently, only the crosstalk component from the adjacent tracks contained in the zeroth-order light can be removed with higher accuracy.

By using a blazed hologram as the holographic diffraction element, extra diffracted light can be reduced and the efficiency of utilization of light can be enhanced. In addition, optical noise due to extra diffracted light can be reduced.

In the description provided above, astigmatism is given to the first-order light by a holographic diffraction element. However, the present invention is not limited to this scheme. For example, the zeroth-order light and the first-order light illuminated onto the detector can be altered as different wavefronts by other methods to vary the focal point on the optical axis to separate the zeroth-order light and the first-order light on the light-receiving surface of the detector and remove the crosstalk component.

Figure 9:
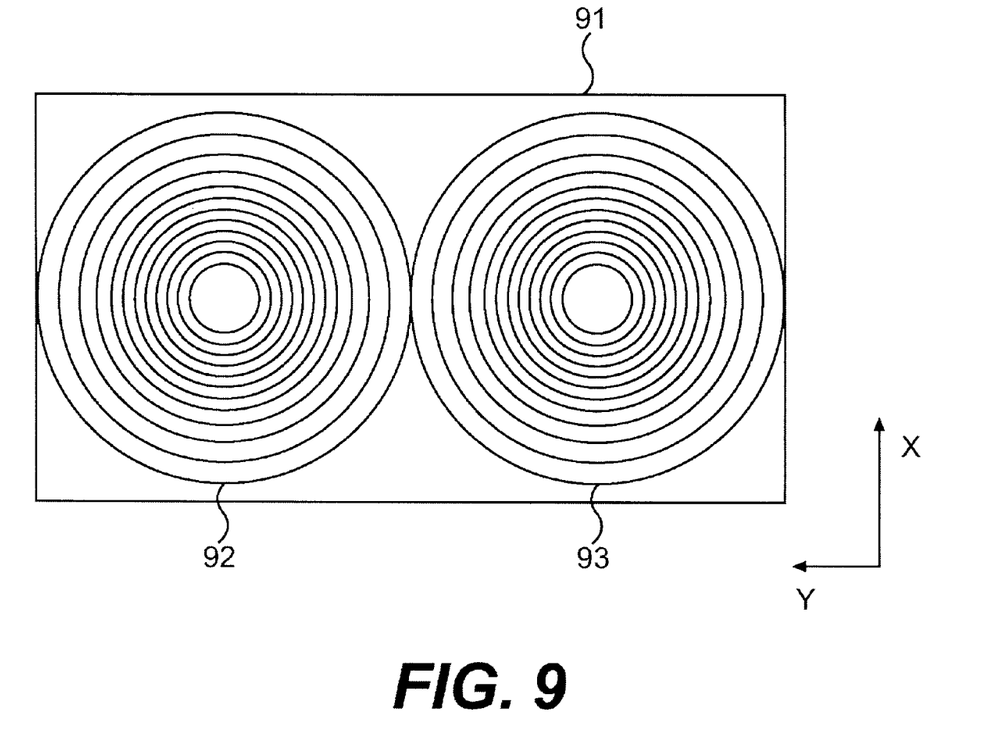
FIG. 9 is a diagram illustrating a holographic diffraction element for use in an optical pickup in accordance with another embodiment of the invention.

FIG. 9 shows an example of holographic diffraction element for producing different focal points on the optical axis by a method not utilizing astigmatism. The holographic diffraction element 91 has two patterns 92 and 93 of concentric circles that are at the same position in the X-axis direction but at different positions in the Y-axis direction. These concentric circles 92 and 93 impart convex-lens action to the first-order light.

Figure 10:
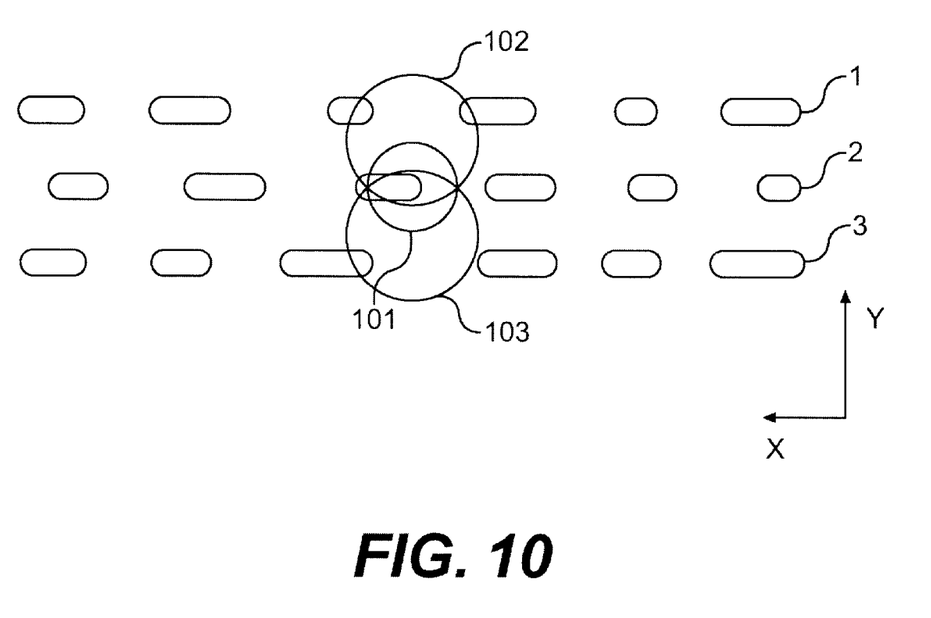
FIG. 10 is a diagram illustrating light beams impinging on the optical disk by the holographic diffraction element shown in FIG. 9.

The zeroth-order light and the first-order light transmitted through the holographic diffraction element 91 create three light spots 101, 102, and 103 on an optical disk, as shown in FIG. 10. The light spot 101 is attributed to the zeroth-order light and is created at the diffraction limit in the same way as in the prior art technique. The light spots 102 and 103 are created by the first-order light diffracted by the two sets of concentric circles, respectively. These spots 102 and 103 are offset with respect to the spot 101 in the Y-axis direction. Since these light spots 102 and 103 are not at the diffraction limit, they are spread more widely than the light spot 101.

Figure 11:
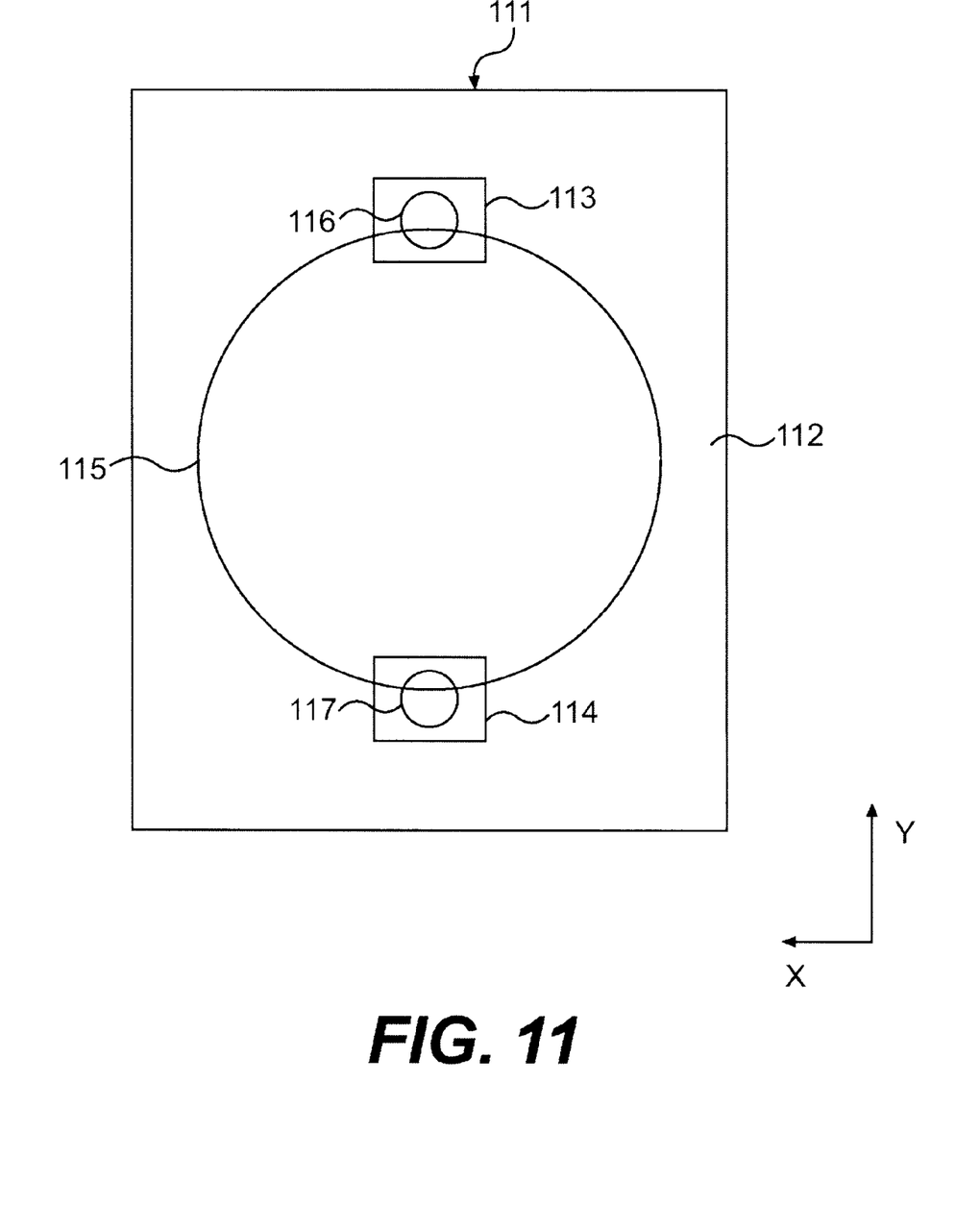
FIG. 11 is a plan view of a detector used to detect beams reflected from the light spots shown in FIG. 10.

Beams reflected from these light spots 101, 102, and 103 can be detected by a detector 111 shown in FIG. 11. This detector 111 is located at the position of diffraction limit of the beams reflected from the light spots 102 and 103 in the X-axis direction. The detector 111 is divided into three light-receiving surfaces 112, 113 and 114. A beam 115 reflected from the light spot 101 falls on the light-receiving surface 112. Beams 116 and 117 reflected from the light spots 102 and 103, respectively, and marginal portions of the reflected beam 115 impinge on the light-receiving surfaces 113 and 114. Since the reflected beams 116 and 117 focused to the diffraction limit is converged and confined to narrow regions, these beams are detected by the narrow light-receiving surfaces 113 and 114, respectively. The crosstalk can be reduced by setting the amplification factors and performing a subtractive calculation in the same way as in the above-described process. In this embodiment, however, the adjacent tracks illuminated by the light spots 102 and 103 are longer in the longitudinal direction of track than the center track illuminated by the light spot 101. As a result, the higher-frequency components of the crosstalk cannot be fully removed. Therefore, it is desired to equalize the output signals from the light-receiving surfaces 112, 113, and 114 for matching their characteristics.

Figure 12:
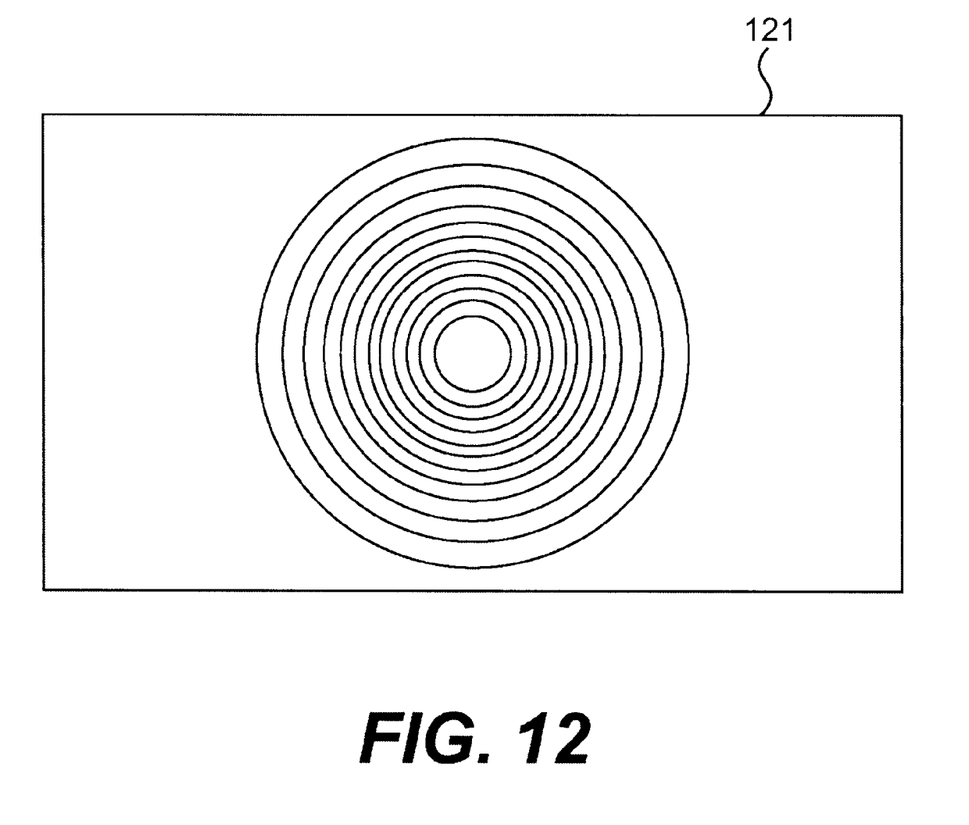
FIG. 12 is a view illustrating a still other holographic diffraction element for use in an optical pickup in accordance with the invention.

In addition to the holographic diffraction element described above, a holographic diffraction element 121 shown in FIG. 12 can be used in removing the crosstalk component. This diffraction element 121 acts like a convex lens or a concave lens producing zeroth-order light and first-order light whose centers of optical axes are made coincident with each other. However, when this holographic diffraction element 121 is employed, higher-frequency components of the crosstalk cannot be fully removed for the same reason as for the holographic diffraction element 91; and so it is desirable to equalize the output signals from the corresponding light-receiving surfaces for matching their characteristics.

Various methods other than the embodiments described above are conceivable. For example, first-order light showing different annular zonal intensities at the focal point from those of the zeroth-order light may be illuminated. When two kinds of first-order light are used, a beam may be illuminated which has coma and whose light intensity increases toward the ends away from the zeroth-order light in the Y-axis direction. That is, the diffraction element and the detector can be shaped variously, as long as two beams different in wavefront and focal distance are made to overlap with each other and are illuminated, and as long as differently shaped images are created by the reflected beams on their respective light-receiving surfaces of the detector as two separated beams.

In the embodiments described above, light beams emanating from one light source are separated using a holographic diffraction element. Instead of the holographic diffraction element, a plurality of light sources may be employed.

As described thus far, a plurality of light beams directed to a recording medium such as an optical disk are made to overlap with each other so that cumbersome adjustments of the light beams on the time axis are unnecessary. Hence, it is easy to reduce the effects of the crosstalk component from the adjacent tracks and the S/N of the reproduced signal can be improved. In addition, the overlapping light beams can be spatially separated on the light-receiving surfaces of the detector, because the overlapping light beams have different wavefronts and focal positions on the optical axis. Consequently, where an optical disk with a narrow track pitch is played back, high-quality signals can be reproduced. In this way, the invention is quite effective in increasing the recording density of the optical disk or the like.

The features and advantages of the invention are apparent from the description and thus is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An optical pickup for reading information from a recording medium, comprising:
    a light illuminating portion for illuminating a plurality of light beams having different wavefronts onto a recording surface of a recording medium to create a plurality of light spots including a first light spot and a second light spot, the first and second light spots at least partially overlapping with each other; and
    a detector for receiving light beams reflected by a recording medium, the detector having a first light-receiving surface for receiving reflected light of the first light spot and a second light-receiving surface for receiving reflected light of the second light spot.

2. The optical pickup according to claim 1, wherein the second light spot has astigmatism.

3. The optical pickup according to claim 2, wherein if the first spot is focused on the recording surface of a recording medium, the second spot is out of focus thereon, and
    wherein the detector is positioned such that the reflected light of the second light spot creates a focal line on the second light-receiving surface while the reflected light of the first light spot is out of focus on the first light-receiving surface.

4. The optical pickup according to claim 1, wherein the second light-receiving surface is smaller in size than the first light-receiving surface.

5. The optical pickup according to claim 1, wherein the light illuminating portion includes a light source for emitting a light beam and a light dividing element for dividing the light beam into the plurality of light beams.

6. The optical pickup according to claim 5, wherein the light dividing element is a diffraction element.

7. The optical pickup according to claim 6, wherein the first light spot is undiffracted light and the second light spot is diffracted light.

8. The optical pick up according to claim 1, wherein the first and second light spots have different focal points on an optical axis.

9. An optical disk drive for reproducing information from a recording medium, comprising:
    an optical pickup including a light illuminating portion for illuminating a plurality of light beams having different wavefronts onto a recording surface of a recording medium to create a plurality of light spots including a first light spot and a second light spot, the first and second light spots at least partially overlapping with each other, and a detector for receiving light beams reflected by a recording medium, the detector having a first light-receiving surface for receiving reflected light of the first light spot and a second light-receiving surface for receiving reflected light of the second light spot; and
    operation means for obtaining a signal representing information recorded on a recording medium based on a first output signal from the first light-receiving surface and a second output signal from the second light receiving surface.

10. The optical disk drive according to claim 9, wherein the second light spot has astigmatism.

11. The optical disk drive according to claim 9, wherein if the first spot is focused on the recording surface of the recording medium, the second spot is out of focus thereon, and
    wherein the detector is positioned such that the reflected light of the second light spot creates a focal line on the second light-receiving surface while the reflected light of the first light spot is out of focus on the first light-receiving surface.

12. The optical disk drive according to claim 9, wherein the second light-receiving surface is smaller in size than the first light-receiving surface.

13. The optical disk drive according to claim 9, wherein the light illuminating portion includes a light source for emitting a light beam and a light dividing element for dividing the light beam into the plurality of light beams.

14. The optical disk drive according to claim 13, wherein the light dividing element is a diffraction element.

15. The optical disk drive according to claim 14, wherein the first light spot is undiffracted light and the second light spot is diffracted light.

16. The optical disk drive according to clam 9, wherein the first and second light spots have different focal points on an optical axis.

17. The optical disc drive according to claim 9 for use with a recording medium having a plurality of recording tracks formed on the recording medium, wherein the operation means reduces a crosstalk component from adjacent tracks.

18. An optical disk drive for reproducing information from a recording medium, comprising:
    a light source for emitting a light beam;
    a diffraction element for diffracting the light beam into at least a zeroth-order light as a first light spot on the recording medium and a first-order light as a second light spot on the recording medium, the first and second light spots having different wavefronts from each other;
    a beam splitter for passing at least the first light spot and the second light spot reflected from a recording surface of the recording medium;

a photodetector having a plurality of light-receiving surfaces for receiving reflections of the at least first light spot and second light spot;

wherein an output of at least two of the light-receiving surfaces is applied to a positive terminal of a subtractor, and an output of at least one of the light-receiving surfaces is multiplied by an amplification factor and is applied to a negative terminal of a subtractor, such that an output from the subtractor is generated that represents a signal component from which an adjacent crosstalk component is reduced.

19. The optical disk drive according to claim 18, wherein the amplification factor is a constant value determined according to track pitch on a recording medium.

20. The optical disk drive according to claim 18, wherein the amplification factor is automatically controlled so as to minimize the amount of the crosstalk component by feedback of the crosstalk component from the subtractor to an amplifier that generates the amplification factor.

21. The optical disk drive according to claim 18, wherein the photodetector comprises a top and bottom light-receiving surface onto which the first light spot is reflected, and a center light-receiving surface onto which the second light spot and a portion of the first light spot is reflected.

22. The optical disk drive according to claim 21, wherein the center light-receiving surface of the photodetector is divided into two portions for receiving a portion of the first and second light spots.

23. The optical disk drive according to claim 18, wherein the diffraction element has a pattern composed of fringes that become denser gradually towards the ends from the center in the direction of the y-axis.

24. The optical disk drive according to claim 18, wherein the diffraction element is formed by arranging two astigmatism-generating patterns symmetrically about the center of the diffraction element in the direction of the y-axis.

25. The optical disk drive according to claim 18, wherein the diffraction element has two patterns of concentric circles that are at a same position in the x-axis direction but at different directions in the y-axis directions.

* * * * *